United States Patent
Hasegawa et al.

(10) Patent No.: US 11,136,636 B2
(45) Date of Patent: *Oct. 5, 2021

(54) STEEL SHEET, PLATED STEEL SHEET, METHOD OF PRODUCTION OF HOT-ROLLED STEEL SHEET, METHOD OF PRODUCTION OF COLD-ROLLED FULL HARD STEEL SHEET, METHOD OF PRODUCTION OF STEEL SHEET, AND METHOD OF PRODUCTION OF PLATED STEEL SHEET

(71) Applicant: JFE STEEL CORPORATION, Tokyo (JP)

(72) Inventors: Hiroshi Hasegawa, Tokyo (JP); Yoshimasa Funakawa, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 180 days.

This patent is subject to a terminal disclaimer.

(21) Appl. No.: 16/089,973

(22) PCT Filed: Jan. 17, 2017

(86) PCT No.: PCT/JP2017/001293
§ 371 (c)(1),
(2) Date: Sep. 28, 2018

(87) PCT Pub. No.: WO2017/168962
PCT Pub. Date: Oct. 5, 2017

(65) Prior Publication Data
US 2019/0071744 A1    Mar. 7, 2019

(30) Foreign Application Priority Data

Mar. 31, 2016 (JP) .............................. JP2016-070752
Nov. 29, 2016 (JP) .............................. JP2016-231057

(51) Int. Cl.
| | |
|---|---|
| *C21D 8/02* | (2006.01) |
| *C23C 2/06* | (2006.01) |
| *C23C 2/02* | (2006.01) |
| *C23C 2/26* | (2006.01) |
| *C22C 38/00* | (2006.01) |
| *C22C 38/06* | (2006.01) |
| *C22C 38/02* | (2006.01) |
| *C22C 38/14* | (2006.01) |
| *C22C 38/12* | (2006.01) |
| *C21D 9/46* | (2006.01) |
| *C22C 38/60* | (2006.01) |
| *C21D 8/00* | (2006.01) |
| *C22C 38/04* | (2006.01) |

(52) U.S. Cl.
CPC ............ *C21D 8/0226* (2013.01); *C21D 8/00* (2013.01); *C21D 8/02* (2013.01); *C21D 8/0236* (2013.01); *C21D 8/0263* (2013.01); *C21D 9/46* (2013.01); *C22C 38/00* (2013.01); *C22C 38/001* (2013.01); *C22C 38/02* (2013.01); *C22C 38/04* (2013.01); *C22C 38/06* (2013.01); *C22C 38/12* (2013.01); *C22C 38/14* (2013.01); *C22C 38/60* (2013.01); *C23C 2/02* (2013.01); *C23C 2/06* (2013.01); *C23C 2/26* (2013.01); *C21D 2211/002* (2013.01); *C21D 2211/005* (2013.01); *C21D 2211/008* (2013.01); *Y02P 10/20* (2015.11)

(58) Field of Classification Search
None
See application file for complete search history.

(56) References Cited

U.S. PATENT DOCUMENTS

| | | |
|---|---|---|
| 2012/0305144 A1 | 12/2012 | Okamoto et al. |
| 2014/0290810 A1 | 10/2014 | Kimura et al. |
| 2017/0037488 A1 | 2/2017 | Hasegawa et al. |

FOREIGN PATENT DOCUMENTS

| | | | |
|---|---|---|---|
| CN | 103038383 A | 4/2013 | |
| CN | 105164299 A | 12/2015 | |
| EP | 2599887 A1 | 6/2013 | |
| EP | 2636762 A1 | 9/2013 | |
| EP | 2811047 A1 * | 12/2014 | ............. C22C 38/06 |
| EP | 2995698 A1 | 3/2016 | |

(Continued)

OTHER PUBLICATIONS

Apr. 6, 2020 Office Action issued in Korean Patent Application No. 10-2018-7027893.
Apr. 8, 2020 Office Action issued in Chinese Patent Application No. 201780021228.0.
Aug. 26, 2019 Office Action issued in European Patent Application No. 17773512.3.
Jan. 3, 2019 Search Report issued in European Patent Application No. 17773512.3.

(Continued)

*Primary Examiner* — Anthony M Liang
(74) *Attorney, Agent, or Firm* — Oliff PLC

(57) ABSTRACT

A steel sheet, a plated steel sheet, and methods for producing a hot-rolled steel sheet, a cold-rolled full hard steel sheet, and a steel sheet. The steel sheet has a specified composition and a microstructure including 0 to 60% of polygonal ferrite and 40 to 100% of a total of martensite, bainite, and residual austenite in terms of an area ratio within 20 μm from the steel sheet surface. The content of Mn in martensite present within 20 μm of the steel sheet surface ($[Mn]_{SM}$) and the content of Mn in a bulk ($[Mn]_B$) satisfy $[Mn]_{SM}/[Mn]_B \leq 1.5$. At a location 300 μm from the steel sheet surface, an area ratio of the martensite is in a range of 40 to 80%, and the polygonal ferrite and the bainite have an average crystal grain size of less than 15 μm.

32 Claims, No Drawings

(56) References Cited

FOREIGN PATENT DOCUMENTS

| EP | 3173494 A1 | 5/2017 |
|---|---|---|
| JP | 2006-161111 A | 6/2006 |
| JP | 2010-275627 A | 12/2010 |
| JP | 2011-144404 A | 7/2011 |
| JP | 5020572 B2 | 9/2012 |
| JP | 2014-51683 A | 3/2014 |
| JP | 2014077203 A | 5/2014 |
| JP | 5640898 B2 | 12/2014 |
| JP | 5655712 B2 | 1/2015 |
| JP | 2015-34334 A | 2/2015 |
| JP | 2015-117403 A | 6/2015 |
| JP | 2015-193907 A | 11/2015 |
| JP | 5825481 B2 | 12/2015 |
| JP | 5884210 B1 | 3/2016 |
| KR | 10-2013-0143278 A | 12/2013 |
| WO | 2011/093490 A1 | 8/2011 |
| WO | 2015/185975 A1 | 12/2015 |
| WO | 2016013144 A1 | 1/2016 |

OTHER PUBLICATIONS

May 15, 2018 Office Action issued in Japanese Patent Application No. 2017-128140.
Oct. 9, 2019 Office Action issued in Chinese Patent Application No. 201780021228.0.
Oct. 22, 2019 Office Action issued in Korean Patent Application No. 10-2018-7027893.
Apr. 25, 2017 International Search Report issued in International Application No. PCT/JP2017/001293.
Oct. 29, 2020 Office Action issued in U.S. Appl. No. 16/089,928.

* cited by examiner

STEEL SHEET, PLATED STEEL SHEET, METHOD OF PRODUCTION OF HOT-ROLLED STEEL SHEET, METHOD OF PRODUCTION OF COLD-ROLLED FULL HARD STEEL SHEET, METHOD OF PRODUCTION OF STEEL SHEET, AND METHOD OF PRODUCTION OF PLATED STEEL SHEET

TECHNICAL FIELD

This application relates to steel sheets, plated steel sheets, a method of production of hot-rolled steel sheets, a method of production of cold-rolled full hard steel sheets, a method of production of steel sheets, and a method of production of plated steel sheets.

BACKGROUND

High strength of steel sheet for use in automobile components is demanded from the viewpoint of improving collision safety and fuel energy of automobiles. However, strengthening of materials generally leads to deterioration in workability. For this reason, development of steel sheet excellent in both strength and workability is required. In particular, high-strength steel sheets having tensile strength (which may be hereinafter referred to as TS) of over 1,180 MPa, are often subjected to bending-based working in a straight shape like members and rocker components because of difficulty in forming, so there is a need for steel sheets excellent in bendability. Rust prevention is required for these components under corrosive conditions.

A hard microstructure in the vicinity of the surface layer promotes occurrence of voids at the time of bending and becomes a starting point of cracking. Therefore, it is important, from the viewpoint of improvement of bendability, to suppress occurrence of voids related to the hard microstructure in high-strength steel sheets having TS of over 1,180 MPa.

In this regard, PTL 1 discloses a technique related to a hot-dip galvanized steel sheet excellent in bendability by controlling hardness of tempered martensite and ferrite.

PTL 2 discloses a technique related to a hot-rolled steel sheet excellent in bendability by reducing martensite while hardening ferrite.

PTL 3 discloses a technique related to a hot-dip galvanized steel sheet excellent in bendability by lowering the strength in the vicinity of the surface layer.

CITATION LIST

Patent Literature

PTL 1: JP-A-2010-275627
PTL 2: JP-A-2006-161111
PTL 3: JP-A-2015-34334

SUMMARY

Technical Problem

However, PTL 1 does not consider micro cracks occurring on the steel sheet surface, and needs further improvement. Despite the fact that a large amount of Si and Mn, which inhibit plating properties, is contained, countermeasures are not disclosed in a manufacturing technology, so that it is conceivable that rust prevention becomes insufficient due to occurrence of non-plating.

PTL 2 related to the hot-rolled steel sheet does not consider plating properties, bending workability in a state where plating is applied, and micro cracks on the bent surface, and needs further improvement.

PTL 3 does not consider micro cracks occurring on the steel sheet surface, and needs further improvement.

The disclosed embodiments have been made under these circumstances, and it is an object of the disclosed embodiments to provide a plated steel sheet excellent in bendability and plating properties with tensile strength of 1,180 MPa or more, and a method of production of such plated steel sheet. The disclosed embodiments are also intended to provide a steel sheet needed to obtain the plated steel sheet, methods of production of a hot-rolled steel sheet and a cold-rolled full hard steel sheet needed to obtain the plated steel sheet, and a method of production of the steel sheet.

Solution to Problem

The present inventors conducted intensive studies to find a solution to the foregoing problems. The studies revealed the following findings.

It was found that voids related to martensite in the vicinity of the surface layer of the steel sheet are strongly influenced by hardness difference between martensite and other phases, the fraction of martensite, and the Mn content in martensite. When Mn-enriched parts are formed on the steel sheet surface, tiny non-plating area generates from the part.

It was also found that non-plating was not generated and excellent bendability was exhibited in the steel sheet having TS of over 1,180 MPa under a condition in which the content of Mn in martensite present in a range of 20 μm in sheet thickness direction from the steel sheet surface ($[Mn]_{SM}$) and the content of Mn in bulk ($[Mn]_B$) are set to satisfy $[Mn]_{SM}/[Mn]_B \leq 1.5$ after performing optimizations of the composition and microstructure of steel.

The disclosed embodiments are based on these findings, and the configuration is as follows.

[1] A steel sheet of a composition including, in mass %, C: 0.05 to 0.25%, Si: 1.0% or less, Mn: 2.0 to 4.0%, P: 0.100% or less, S: 0.02% or less, Al: 1.0% or less, N: 0.001 to 0.015%, one or more selected from the group consisting of Ti: 0.003 to 0.100%, Nb: 0.003 to 0.100%, Mo: 0.005 to 0.500%, and the balance being Fe and unavoidable impurities, wherein polygonal ferrite is 0 to 60%, and a total of martensite, bainite, and residual austenite is 40 to 100% in terms of an area ratio in a range of 20 μm in a sheet thickness direction from a steel sheet surface, wherein the content of Mn in martensite present in the range of 20 μm in the sheet thickness direction from the steel sheet surface ($[Mn]_{SM}$) and the content of Mn at a location (in a bulk) of ¼-thickness of the steel sheet toward a center in the sheet thickness direction from the steel sheet surface ($[Mn]_B$) satisfies $[Mn]_{SM}/[Mn]_B \leq 1.5$, and wherein at a location 300 μm in the sheet thickness direction from the steel sheet surface, the martensite has an area ratio of 40 to 80% and the polygonal ferrite and the bainite have an average crystal grain size of less than 15 μm.

[2] The steel sheet according to item [1], wherein the composition further includes at least one selected from the group consisting of, in mass %, Cr: 0.005 to 2.000%, V: 0.005 to 2.000%, Cu: 0.005 to 2.000%, Ni: 0.005 to 2.000%, B: 0.0001 to 0.0050%, Ca: 0.0001 to 0.0050%, REM: 0.0001 to 0.0050%, Sb: 0.0010 to 0.1000%, and Sn: 0.0010 to 0.5000%.

[3] The steel sheet according to item [1] or [2], wherein an average crystal grain size of the martensite present in the range of 20 μm in the sheet thickness direction from the steel sheet surface is 20 μm or less.

[4] A plated steel sheet comprising a plating layer on a surface of the steel sheet of any one of items [1] to [3].

[5] The plated steel sheet according to item [4], wherein the plating layer is a hot-dip galvanized layer or a hot-dip galvannealed layer.

[6] A method for producing a hot-rolled steel sheet, including:

hot rolling the slab of the composition of item [1] or [2], hot-rolling including finish-rolling under conditions that a temperature from a second-last pass to the last pass is 800 to 950° C., a cumulative rolling ratio from the second-last pass to the last pass is 10 to 40%, and a rolling ratio of the last pass is 8 to 25%;

cooling with start in a range of 0.5 to 3.0 sec after an end of finish-rolling and at an average cooling rate of 30° C./s or more in a temperature range of 600 to 720° C.; and coiling at a temperature of 590° C. or lower.

[7] A method for producing a cold-rolled full hard steel sheet, including: cold rolling the hot-rolled steel sheet obtained by the method of item [6] at a cold-rolling ratio of 20% or more.

[8] A method for producing a steel sheet, comprising annealing the hot-rolled steel sheet obtained by the method of item [6] or the cold-rolled full hard steel sheet obtained by the method of item [7], wherein the hot-rolled steel sheet or the cold-rolled full hard steel sheet is heated to a temperature of 730 to 900° C. at an average heating rate of 1.0° C./s or more in a temperature range of 500 to 650° C. and is then cooled to a cooling stop temperature of 400 to 590° C. at an average cooling rate of 5° C./s or more, and wherein the hot-rolled steel sheet or the cold-rolled full hard steel sheet is retained for 10 to 1,000 sec in a temperature range of 730 to 900° C. at the time of the heating and the cooling, and is retained for 1,000 sec or less in a temperature range of 400 to 590° C.

[9] The method according to item [8], wherein a dew point in a temperature range of 730 to 900° C. is −40° C. or lower.

[10] A method for producing a plated steel sheet, including:

plating the steel sheet obtained by the method of item [8] or [9]; and cooling the steel sheet to room temperature at an average cooling rate of 3° C./s or more.

As used herein, "high-strength" means a TS of 1,180 MPa or more, "excellent bendability" means that an R/t (to be described below) is 3.5 or less, and "excellent plating properties" means that non-plating having a diameter of 0.5 mm is not recognized when the surface of the galvanized steel sheet surface is observed with a magnifier at a magnification of 10 times.

Advantageous Effects

The disclosed embodiments enable providing a plated steel sheet having excellent bendability and plating properties with tensile strength of 1,180 MPa or more. Because of these properties, the plated steel sheet of the disclosed embodiments is preferred as material of automobile components.

The steel sheet, and the methods of production of hot-rolled steel sheets, cold-rolled full hard steel sheets, and steel sheets of the disclosed embodiments contribute to improving the collision safety and the fuel consumption of automobiles as an intermediate product for obtaining the plated steel sheet having desirable properties as above mentioned, or as methods for producing such intermediate products.

DETAILED DESCRIPTION

An embodiment of the disclosed embodiments is described below.

The disclosed embodiments include a steel sheet, a plated steel sheet, a method of production of hot-rolled steel sheets, a method of production of cold-rolled full hard steel sheets, a method of production of steel sheets, and a method of production of plated steel sheets. The following firstly describes how these are related to one another.

The steel sheet of the disclosed embodiments is also an intermediate product for obtaining the plated steel sheet of the disclosed embodiments. The steel sheet of the disclosed embodiments is produced from a starting steel material such as a slab through producing processes that produce a hot-rolled steel sheet and a cold-rolled full hard steel sheet. Further, the plated steel sheet of the disclosed embodiments is obtained from plating of the steel sheet.

The method for producing a hot-rolled steel sheet of the disclosed embodiments is apart of the foregoing processes that produces a hot-rolled steel sheet.

The method for producing a cold-rolled full hard steel sheet of the disclosed embodiments is a part of the foregoing processes that produces a cold-rolled full hard steel sheet from the hot-rolled steel sheet.

The method for producing a steel sheet of the disclosed embodiments is a part of the foregoing processes that produces a steel sheet from the cold-rolled full hard steel sheet.

The method for producing a plated steel sheet of the disclosed embodiments is apart of the foregoing processes that produces a plated steel sheet from the steel sheet.

Because of these relationships, the hot-rolled steel sheet, the cold-rolled full hard steel sheet, and the steel sheet, plated steel sheet has a common composition. Likewise, the steel sheet and the plated steel sheet share the same steel microstructure. The following describes such common features first, followed by the steel sheet, the plated steel sheet, and the methods of production of these members, in this order.

<Composition of Hot-Rolled Steel Sheet, Cold-Rolled Full Hard Steel Sheet, Steel Sheet, and Plated Steel Sheet>

The hot-rolled steel sheet, the cold-rolled full hard steel sheet, the steel sheet, and the plated steel sheet have a composition, in mass %, C: 0.05 to 0.25%, Si: 1.0% or less, Mn: 2.0 to 4.0%, P: 0.100% or less, S: 0.02% or less, Al: 1.0% or less, N: 0.001 to 0.015%, at least one selected from Ti: 0.003 to 0.100%, Nb: 0.003 to 0.1001, and Mo: 0.005 to 0.500%, and the balance being Fe and unavoidable impurities.

The composition may further contain, in mass %, at least one selected from Cr: 0.005 to 2.000%, V: 0.005 to 2.000%, Cu: 0.005 to 2.000%, Ni: 0.005 to 2.000%, B: 0.0001 to 0.0050%, Ca: 0.0001 to 0.0050%, REM: 0.0001 to 0.0050%, Sb: 0.0010 to 0.10001, and Sn: 0.0010 to 0.5000%.

The following describes each composition. In the following description, "%" representing the content of each composition means "mass %". In addition, "amount" means "content amount".

C: 0.05 to 0.25%

Carbon (C) is an element that is effective for increasing TS by forming martensite or bainite. When the C content is less than 0.05%, such an effect cannot be sufficiently obtained, and TS of 1,180 MPa or more cannot be obtained. On the other hand, when C content exceeds 0.25%, martensite is hardened and bendability significantly deteriorates. For this reason, the C content is 0.05 to 0.25%. The C content is preferably 0.07% or more, more preferably 0.22 or less, and further more preferably 0.20% or less.

Si: 1.0% or less

Silicon (Si) is an element that is effective for increasing TS through solid-solution strengthening of steel, but is also an element that significantly inhibits plating properties and leads to non-plating. The upper limit of the Si content is 1.0% in the disclosed embodiments. For this reason, the Si content is 1.0% or less, preferably 0.8% or less, more preferably 0.6% or less. The lower limit is not particularly specified, but is preferably 0.005% or more from the viewpoint of workability.

Mn: 2.0 to 4.0%

Manganese (Mn) is an element that is effective for increasing TS through formation of martensite and bainite. When the Mn content is less than 2.0%, such an effect cannot be sufficiently obtained, and polygonal ferrite is excessively formed to cause a decrease of Tensile Strength (TS) and the deterioration of bendability. On the other hand, when the Mn content exceeds 4.0%, the steel becomes brittle and the bendability of the disclosed embodiments cannot be obtained. For this reason, the Mn content is 2.0 to 4.0%. Preferably, the Mn content is 3.5% or less, and more preferably 3.0% or less.

P: 0.100% or less

Phosphorus (P) makes grain boundaries brittle and deteriorates bendability. It is accordingly preferable to contain phosphorus in as low as possible. In the disclosed embodiments, phosphorus may be contained in an amount of at most 0.100%. For this reason, the P content is 0.100% or less. The lower limit is not particularly specified, but P of about 0.001% may be inevitably mixed in the steel. For this reason, the P content is preferably 0.001% or more because the production efficiency is lowered in the case of being less than 0.001%.

S: 0.02% or less

Sulfur (S) increases inclusions and deteriorates bendability. It is accordingly preferable to contain sulfur in as low as possible. In the disclosed embodiments, however, sulfur may be contained in an amount ("amount" means "content amount") of at most 0.02%. For this reason, the S content is 0.02% or less. The lower limit is not particularly specified, but is preferably 0.0005% because the production efficiency is lowered in the case of being less than 0.0005%.

Al: 1.0% or less

Aluminum (Al) acts as effective as a deoxidizing agent, and is preferably contained at the time of deoxidation. When a large amount of Al is contained, a large amount of polygonal ferrite is formed to cause the deterioration of TS and bendability. In the disclosed embodiments, however, the upper limit of the Al content is 1.0%. For the reason, the Al content is 1.0% or less. Preferably, the Al content is 0.010% or more. The Al content is preferably 0.50% or less.

The total content of Si and Al is preferably less than 0.8% in terms of plating properties. Even in the case of being less than 0.8%, the effect of the disclosed embodiments can be sufficiently obtained.

N: 0.001 to 0.015%

Nitrogen (N) is an element that forms nitrides such as AlN, and is effective at refining the grain size. Nitrogen needs to be contained in an amount of 0.001% or more to obtain this effect. On the other hand, when the N content is more than 0.015%, coarse nitrides occur, the effect of making fine grains becomes weaker, and bendability deteriorates due to coarse nitrides. For this reason, the N content is 0.001 to 0.015%, preferably 0.002% or more, more preferably 0.003% or more. Preferably, the N content is 0.012% or less, more preferably 0.010% or less.

At least One selected from Ti: 0.003 to 0.1001, Nb: 0.003 to 0.100%, and Mo: 0.005 to 0.500%

Titanium (Ti), niobium (Nb), and molybdenum (Mo) are effective elements for forming carbides at the time of annealing to refine the microstructure and suppress cracks during bending due to precipitation hardening and to improve bendability. In order to obtain such an effect, at least one selected from Ti: 0.003 or more, Nb: 0.003 or more, and Mo: 0.005 or more should be contained. On the other hand, when contained in amounts above the above-described specified limits, these elements may cause coarsening of carbides and an adverse effect such as deterioration in bendability. For this reason, the contents of Ti, Nb, and Mo, when contained, are Ti: 0.003 to 0.100%, Nb: 0.003 to 0.100%, and Mo: 0.005 to 0.500%. Preferably, the Ti content is 0.010% or more, the Nb content is 0.010% or more, and the Mo content is 0.010% or more. Preferably, the Ti content is 0.060% or less, the Nb content is 0.0801 or less, and the Mo content is 0.300% or less.

The balance is Fe and unavoidable impurities.

The steel sheet of the disclosed embodiments has the basic composition described above. The composition may also appropriately contain one or more of the following optional elements, as required.

At least One Selected from Cr: 0.005 to 2.000%, V: 0.005 to 2.000%, Cu: 0.005 to 2.000%, Ni: 0.005 to 2.000%, B: 0.0001 to 0.0050%, Ca: 0.0001 to 0.0050%, REM: 0.0001 to 0.0050%, Sb: 0.0010 to 0.1000%, and Sn: 0.0010 to 0.5000%

Cr, V, and Cu are elements that are effective for forming martensite and bainite to increase the strength of steel. In order to obtain such an effect, the contents of these elements are preferably Cr: 0.005% or more, V: 0.005% or more, and Cu: 0.005% or more. When the contents of Cr, V, and Cu are more than 2.000%, 2.000%, and 2.000%, respectively, deterioration of bendability and non-plating due to inhibition of plating properties are caused.

The contents of these elements, when contained, are Cr: 0.005 to 2.000%, V: 0.005 to 2.000%, and Cu: 0.005 to 2.000%.

Nickel (Ni) is an element that is effective for forming martensite and bainite and increasing the strength of steel. In order to obtain this effect, the Ni content is preferably 0.005% or more. When the Ni content is more than 2.000%, the properties of martensite changes, resulting in deterioration of bendability. The content of Ni, when contained, is 0.005 to 2.000%.

Boron (B) is an element that is effective for improving hardenability of the steel sheet, forming martensite and bainite, and increasing the strength of steel. In order to obtain such an effect, the B content is preferably 0.0001% or more. On the other hand, when the B content is more than 0.0050%, inclusions increase and bendability deteriorates. For this reason, the content of B, when contained, is 0.0001 to 0.0050%.

Ca and REM are elements that are effective for improving bendability by controlling the form of inclusions. In order to obtain such an effect, the content of these elements are preferably Ca: 0.0001% or more and REM: 0.0001% or more. On the other hand, when the contents of Ca and REM are more than 0.0050%, respectively, the amount of inclusions increases and bendability deteriorates. For this reason, the contents of these elements, when contained, are Ca: 0.0001 to 0.0050% and REM: 0.0001 to 0.0050%.

Sb and Sn are elements that are effective for inhibiting reactions such as denitrogenation and deboronation and inhibiting strength reduction of the steel. In order to obtain such an effect, the contents of these elements are preferably Sb: 0.0010% or more and Sn: 0.0010 or more. On the other hand, when the Sb content is more than 0.1000% and the Sn content is more than 0.5000%, bendability deteriorates due to embrittlement of grain boundaries. For this reason, the contents of these elements, when contained, are Sb: 0.0010 to 0.1000% and Sn: 0.0010 to 0.5000%.

In the disclosed embodiments, additional elements Zr, Mg, La, and Ce may be contained in a total amount of at most 0.002%.

$[Mn]_{SM}/[Mn]_B$ being ratio of content of Mn in martensite present in range up to 20 μm in sheet thickness direction from steel sheet surface ($[Mn]_{SM}$) to content of Mn in bulk ($[Mn]_B$): 1.5 or Less When the $[Mn]_{SM}/[Mn]_B$ is more than 1.5, bendability deteriorates and plating properties also deteriorates. Although the mechanism of the deterioration in bendability is not clear, it is assumed that void formation is promoted due to a sharp Mn concentration gradient at the interface during deformation and cracks easily occurs when the content of Mn in hard martensite increases and the difference in Mn content from other microstructures becomes large. For this reason, the $[Mn]_{SM}/[Mn]_B$ is 1.5 or less, preferably 1.4 or less, and more preferably 1.3 or less.

The amount of Mn in the bulk means the Mn content at a location of ¼ toward the center in the sheet thickness direction from the steel sheet surface.

The $[Mn]_{SM}$ and the $[Mn]_B$ were measured by the following method. A sample was cut from the annealed steel sheet, a cross section was taken through the thickness parallel to the rolling direction, and a microstructure of the cross section was observed. In the range to the location of 20 μm in the sheet thickness direction from the steel sheet surface, EDX analysis was performed on the central part of the microstructure corresponding to white and light gray parts excluding carbides in each of ten fields of view, and the average Mn content (Mn content in martensite) was calculated, which was defined as $[Mn]_{SM}$. In the location of ¼ toward the center in the sheet thickness direction from the steel sheet surface, EDX analysis was performed on parts other than the white and light gray parts in each of ten fields of view, the average Mn content (Mn content in martensite) was calculated, and $[Mn]_B$ was determined from the fraction of martensite and the Mn content in martensite and from the fractions of phases other than martensite and the Mn contents in phases other than martensite.

<Steel Microstructure of Steel Sheet and Plated Steel Sheet>
Area Ratio of Polygonal Ferrite within Range of 20 μm in Sheet Thickness Direction from Steel Sheet Surface: 0 to 60%

When the polygonal ferrite is formed within the range of 20 μm in the sheet thickness direction from the steel sheet surface, bendability deteriorates due to the difference in hardness between the ferrite and martensite. For this reason, the area ratio of polygonal ferrite needs to be reduced as much as possible. In the steel sheet of the disclosed embodiments, the area ratio of polygonal ferrite can be 60% or less. Accordingly, the area ratio of polygonal ferrite within a range of 20 μm in the sheet thickness direction from the steel sheet surface is 0 to 60%. The upper limit thereof is preferably less than 40%, more preferably 38% or less, and further more preferably 34% or less. The lower limit is more than 10%, and more preferably 13% or more.

Area Ratio of Martensite, Bainite, and Residual Austenite within Range of 20 μm in Sheet Thickness Direction from Steel Sheet Surface: 40 to 100% in Total Excellent bendability can be obtained in the steel sheet and the plated steel sheet of the disclosed embodiments by formation of a large amount of martensite, bainite, and residual austenite microstructure within the range of 20 μm in the sheet thickness direction from the steel sheet surface. For this reason, the area ratio of martensite, bainite, and residual austenite within the range of 20 μm in the sheet thickness direction from the steel sheet surface is 40 to 100% in total, preferably 50% or more.

Area Ratio of Martensite at Location of 300 μm in Sheet Thickness Direction from Steel Sheet Surface: 40 to 80%

TS of 1,180 MPa or more can hardly be obtained when the area ratio of martensite in the vicinity of 300 μm in the sheet thickness direction from the steel sheet surface is less than 40%. On the other hand, when the area ratio of martensite exceeds 80%, bendability deteriorates. For this reason, the area ratio of martensite in the vicinity of 300 μm in the sheet thickness direction from the steel sheet surface is preferably 40 to 80%. Preferably, the area ratio of martensite is 45% or more. Preferably, the area ratio of martensite is 75% or less.

Basically, pearlite is not contained in the steel sheet, but when contained, the area ratio is preferably 3% or less.

As used herein, the area ratio of polygonal ferrite, martensite, bainite, and residual austenite means the area proportion of each microstructure in the observed area, and is measured in the manner described below. A sample is cut from the annealed steel sheet, and a cross section taken through the thickness parallel to the rolling direction is polished. Then, after corroding the surface with 3% nital, a micrograph is taken for three fields of view at a location in the vicinity of the steel sheet surface (a location of 20 μm in the sheet thickness direction from the steel sheet surface) and at a location of 300 μm in the sheet thickness direction from the steel sheet surface, using a SEM (scanning electron microscope) at a magnification of 1,500 times. The area ratio of each microstructure is determined from the obtained image data, using the Image-Pro available from Media Cybernetics, and the average area ratio of these fields of view is defined as the area ratio of each microstructure. In the image data, the polygonal ferrite appears black having a smooth curved grain boundary, martensite and residual austenite appear white or light gray, and bainite appears gray or dark gray including carbides having a straight grain boundary with aligned orientations or island-like martensite, whereby these phases are distinguished from each other. According to the method of the disclosed embodiments, tempered martensite having dark gray or black color and including carbides is not formed, but such tempered martensite may deteriorate bendability, so it is preferably not contained. Martensite including carbides with non-aligned orientations differs from bainite. In the steel sheet of the disclosed embodiments, the carbides can be distinguished as a white dot or a line. Although not contained in the steel sheet of the disclosed embodiments, pearlite can be distinguished as a laminar structure of black and white.

Average crystal grain size of Polygonal ferrite and Bainite at Location 300 μm in Sheet thickness from Steel sheet surface: less than 15 μm If either one of the average crystal grain size of the polygonal ferrite or the bainite is 15 μm or more, the high strength and the bendability of the disclosed embodiments cannot be achieved at the same time. Therefore, the average crystal grain size of the polygonal ferrite or the bainite at the location 300 μm in the sheet thickness from the steel sheet surface is less than 15 μm, preferably 10 μm or less, and more preferably 8 μm or less.

Average crystal grain size of Martensite in Range of 20 μm in Sheet thickness from Steel sheet surface: 20 μm or Less (Preferred Condition)

When the average crystal grain size of martensite is set to 20 μm or less, formation of coarse voids in bending deformation is prevented and bendability can be further improved. Therefore, the average crystal grain size of martensite in the range of 20 μm in the sheet thickness from the steel sheet surface is 20 μm or less, more preferably 15 μm or less, and further more preferably 10 μm or less.

The average crystal grain size of the polygonal ferrite and the bainite and the average crystal grain size of the martensite can be measured by the following method.

The average crystal grain size of the polygonal ferrite and the bainite was the square root of an average value of values obtained by dividing the area of structures having the features of polygonal ferrite and bainite existing within the same field of view as the method of measuring the area ratio by the number of respective structures. The average crystal grain size of the martensite was the square root of an average value of values obtained by dividing the total area of white and light gray structures existing within the same field of view as the method of measuring the area ratio by the number of structures. In the steel sheet of the disclosed embodiments, packet boundaries and block boundaries are not included in grain boundaries.

<Steel Sheet>

The composition and the steel microstructure of the steel sheet are as described above. In addition, the thickness of the steel sheet is not particularly limited, and is typically 0.4 mm or more and 6.0 mm or less.

<Plated Steel Sheet>

The plated steel sheet of the disclosed embodiments is a plated steel sheet including a plating layer on a surface of the steel sheet of the disclosed embodiments. The plating layer is not particularly limited, and may be, for example, a hot-dip plating layer or an electroplating plating layer. Further, the plating layer may also be an alloyed plating layer. The plating layer is preferably a galvanized layer. The galvanized layer may contain Al or Mg. Hot-dip zinc-aluminum-magnesium alloy plating (Zn—Al—Mg plating layer) is also preferred. In this case, the Al content is preferably 1 mass % or more and 22 mass % or less, and the Mg content is preferably 0.1 mass % or more and 10 mass % or less. The Zn—Al—Mg plating layer also may contain one or more selected from Si, Ni, Ce, and La in a total amount of 1 mass % or less. The plated metal is not particularly limited, and metals such as aluminum may be plated, other than zinc described above.

The composition of the plating layer is not particularly limited, and the plating layer may have a common composition. The plating layer may be, for example, a hot-dip galvanized layer or a hot-dip galvannealed layer containing Fe: 20.0 mass % or less, Al: 0.001 mass % or more and 1.0 mass % or less, one or more selected from Pb, Sb, Si, Sn, Mg, Mn, Ni, Cr, Co, Ca, Cu, Li, Ti, Be, Bi, and REM in a total amount of 0 mass % or more and 3.5 mass % or less, and the balance being Zn and unavoidable impurities. For example, the plating layer may preferably be a hot-dip galvanized layer with the plating metal in an amount of 20 to 80 $g/m^2$ for each side, or a hot-dip galvannealed layer produced as an alloyed layer of such plating layers. When the plating layer is a hot-dip galvanized layer, the Fe content in the plating layer is less than 7 mass % When the plating layer is a hot-dip galvannealed layer, the Fe content in the plating layer is 7 to 15 mass %.

Production methods of the disclosed embodiments will be described below.

<Method of Production of Hot-Rolled Steel Sheet>

A method for producing a hot-rolled steel sheet of the disclosed embodiments uses a slab of the composition described above for the hot-rolled steel sheet, the cold-rolled full hard steel sheet, the steel sheet, and the plated steel sheet, and includes: hot rolling the slab, hot rolling including finish-rolling under conditions that a temperature from a second-last pass to the last pass is 800 to 950° C., a cumulative rolling ratio from the second-last pass to the last pass is 10 to 40%, and a rolling ratio of the last pass is 8 to 25%; cooling with start in a range of 0.5 to 3.0 sec after an end of finish-rolling, at an average cooling rate of 30° C./s or more in a temperature range of 600 to 720° C.; and coiling at a temperature of 590° C. or lower. The following describes these conditions. In the following, the temperature means steel sheet surface temperature, unless otherwise specifically stated. The steel sheet surface temperature may be measured with, for example, a radiation thermometer. The average cooling rate is represented by ((surface temperature before cooling−surface temperature after cooling)/cooling time).

Production of Slab

The melting method for production of the slab is not particularly limited, and various known melting methods may be used, including, for example, a method using a converter furnace and a method using an electric furnace. It is also possible to perform secondary refining with a vacuum degassing furnace. After that, preferably, the slab (steel material) may be produced by a known continuous casting method for sake of prevention of macro segregation. Further, the slab may be produced using known casting methods such as ingot casting-slabbing rolling and thin-slab continuous casting.

For hot rolling of a slab, the slab may be first cooled to room temperature, and then reheated for hot rolling, or the slab may be hot rolled by being charged into a heating furnace without being cooled to room temperature. Alternatively, an energy-saving process may be applied in which hot rolling is performed immediately after slightly warming the slab.

When heating the slab, the slab is heated to preferably 1,100° C. or higher to dissolve the carbides, or to prevent increase of the rolling load. The slab heating temperature is preferably 1,300° C. or lower to prevent increase of a scale loss. The slab temperature is the temperature of a slab surface.

The next step is hot rolling. The rough rolling conditions are not particularly limited. The sheet bar after rough rolling may be heated. It is also possible to perform continuous rolling, in which finish rolling is continuously performed on joined sheet bars.

Temperature from The Second-Last Pass to Last pass: 800 to 950° C.

In the disclosed embodiments, it is important, from the viewpoint of hot-rolled microstructure and annealed microstructure formation, to define a cumulative rolling ratio and a temperature from the second-last pass to the last pass in the finish rolling.

When the finish rolling temperature is lower than 800° C., ferrite is formed, and unevenness in concentration of Mn occurs in the surface layer of the hot-rolled steel sheet to cause enrichment of Mn in austenite during annealing, whereby $[Mn]_{SM}/[Mn]_B$ exceeds 1.5 and bendability and plating properties deteriorate. On the other hand, the finish rolling temperature is higher than 950° C., coarse grains are formed on the surface layer of the hot-rolled steel sheet to cause coarse polygonal ferrite during subsequent annealing, whereby Mn is enriched in austenite, $[Mn]_{SM}/[Mn]_B$ exceeds 1.5, and bendability and plating properties deteriorate. For this reason, the temperature from the second-last pass to the last pass is 800 to 950° C. Preferably, the temperature is 830° C. or higher. The temperature is preferably 920° C. or lower.

Cumulative Rolling ratio from The Second-Last Pass to Last Pass: 10 to 40%

When the cumulative rolling ratio of the second-last pass to the last pass is less than 10%, worked austenite remains to promote ferrite formation and to cause unevenness in concentration of Mn in the surface layer of the hot-rolled steel sheet, Mn is enriched in austenite during annealing, $[Mn]_{SM}/[Mn]_B$ exceeds 1.5, and bendability and plating properties deteriorate. On the other hand, when the cumulative rolling ratio of the second-last pass to the last pass exceeds 40%, recrystallization is excessively promoted, a coarse microstructure remains on the surface layer of the hot-rolled steel sheet, coarse polygonal ferrite is formed during subsequent annealing to cause enrichment of Mn in austenite, $[Mn]_{SM}/[Mn]_B$ exceeds 1.5, and bendability and plating properties deteriorate.

Rolling ratio of Last Pass; 8 to 25%

When the rolling ratio of the last pass is less than 8%, expanded grains remain, coarse polygonal ferrite is formed during annealing to cause enrichment of Mn in austenite, $[Mn]_{SM}/[Mn]_B$ exceeds 1.5, and bendability and plating properties deteriorate. On the other hand, when the rolling ratio of the last pass exceeds 25%, ferrite formation is promoted to cause unevenness in concentration of Mn in the surface layer of the hot-rolled steel sheet, Mn is enriched in austenite during annealing, $[Mn]_{SM}/[Mn]_B$ exceeds 1.5, and bendability and plating properties deteriorate. For this reason, the rolling ratio of the last pass is 8 to 25%. Preferably, the rolling ratio of the last pass is 10% or more. The rolling ratio of the last pass is preferably 20% or less.

Start of Cooling for 0.5 to 3.0 sec after End of Finish-Rolling

When the time until the start of cooling from the end of finish rolling is less than 0.5 s, large strain is accumulated in austenite, resulting in promoting ferrite formation, whereby unevenness in concentration of Mn is caused in the surface layer of the hot-rolled steel sheet, Mn is enriched in austenite during annealing, $[Mn]_{SM}/[Mn]_B$ exceeds 1.5, and bendability and plating properties deteriorate. On the other hand, the time exceeds 3.0 sec, the strain in austenite is completely released, a coarse microstructure remains on the surface layer of the hot-rolled steel sheet, coarse polygonal ferrite is formed during subsequent annealing to cause enrichment of Mn in austenite, $[Mn]_{SM}/[Mn]_B$ exceeds 1.5, and bendability and plating properties deteriorate. For this reason, the time until the start of cooling from the finish rolling is 0.5 to 3.0 sec.

Cooling at Average Cooling Rate of 30° C./s or More in Temperature Range of 600 to 720° C.

When the average cooling rate in the temperature range of 600 to 720° C. is less than 30° C./s, ferrite is formed to cause unevenness in concentration of Mn in the surface layer of the hot-rolled steel sheet and to cause enrichment of Mn in austenite during annealing, $[Mn]_{SM}/[Mn]_B$ exceeds 1.5, and bendability and plating properties deteriorate. For this reason, the average cooling rate in the temperature range of 600 to 720° C. is 30° C./s or more. Although not particularly specified, the upper limit of the average cooling rate is preferably 1,000° C./s or less because characteristic variation is caused due to unevenness in temperature when the average cooling rate exceeds 1000° C./s.

In order to reduce the rolling load, or to make uniform shapes or materials, it is preferable to perform lubrication rolling that makes the coefficient of friction 0.10 to 0.25 in some of or all of the passes of the finish rolling.

Coiling Temperature: 590° C. or Lower

When the coiling temperature is higher than 590° C., ferrite formation is promoted to cause unevenness in concentration of Mn in the surface layer of the hot-rolled steel sheet, Mn is enriched in austenite during annealing, $[Mn]_{SM}/[Mn]_B$ exceeds 1.5, and bendability and plating properties deteriorate. For this reason, the coiling temperature is 590° C. or lower. The coiling temperature is preferably higher than 300° C. in terms of bendability.

The steel sheet is cooled by air cooling or the like after the coiling, and is used for production of a cold-rolled full hard steel sheet as described below. When the hot-rolled steel sheet is to be sold in the form of an intermediate product, the hot-rolled steel sheet is typically prepared into a commercial product after being coiled and cooled.

<Method of Production of Cold-Rolled Full Hard Steel Sheet>

A method for producing a cold-rolled full hard steel sheet of the disclosed embodiments is a method in which the hot-rolled steel sheet obtained by the above-described method is cold rolled at a rolling ratio of 20% or more.

In the disclosed embodiments, it is necessary to make the rolling ratio 20% or more when the steel sheet is subjected to cold rolling. When the rolling ratio is less than 20%, coarse ferrite is formed during annealing to cause enrichment of Mn in austenite, $[Mn]_{SM}/[Mn]_B$ exceeds 1.5, and bendability and plating properties deteriorate. For this reason, when the cold rolling is performed, the rolling ratio is 20% or more, preferably 30% or more. Although not be particularly specified, the upper limit of the rolling ratio is preferably 95% or less in terms of shape stability or the like.

Pickling may be performed before the cold rolling. The pickling conditions may be appropriately set.

<Method of Production of Steel Sheet>

A method for producing a steel sheet of the disclosed embodiments is a method that includes: heating the hot-rolled steel sheet or the cold-rolled full hard steel sheet obtained by the above-described production method up to a temperature of 730° C. to 900° C. at an average heating rate of 1.0° C./s or more in a temperature range of 500° C. to 650° C.; cooling the steel sheet to the cooling stop temperature of 400 to 590° C. at the average cooling rate of 5° C./s or more; retaining the steel sheet for 10 to 1000 sec in the temperature range of 730 to 900° C. from the heating to the cooling; and annealing it under a retention of 1000 sec or less in the temperature range of 400 to 590° C. The annealing may be followed by temper rolling, as required.

Heating to Temperature of 730° C. to 900° C. (Annealing Temperature) at Average heating Rate of 1.0° C./s or more in Temperature Range of 500° C. to 650° C.

Average heating rate in Temperature range of 500° C. to 650° C.: 1.0° C./s or More If the average heating rate is less than 1.0° C./s, polygonal ferrite and bainite become coarse grains and the microstructure of the disclosed embodiments cannot be obtained. Therefore, the average heating rate in the temperature of 500 to 650° C. should be 1.0° C./s or more. The upper limit is not specified, and may exceed 1000° C./s like an induction heater.

When the annealing temperature is lower than 730° C., austenite is insufficiently formed. In addition, coarse grains remain. Since austenite formed by annealing becomes martensite or bainite in the final microstructure due to bainite transformation or martensite transformation, when austenite is insufficiently formed, the microstructure of the steel sheet of the disclosed embodiments cannot be obtained. In addition, when austenite is slightly formed, since enrichment of Mn in austenite is facilitated, $[Mn]_{SM}/[Mn]_B$ exceeds 1.5 and bendability and plating properties deteriorate.

On the other hand, when the annealing temperature is higher than 900° C., coarse grains are formed, and surface enrichment of Si and Mn becomes large, resulting in non-plating. For this reason, the annealing temperature is 730 to 900° C. Preferably, the annealing temperature is 740° C. or higher. The annealing temperature is preferably 860° C. or lower.

Average Cooling Rate from Annealing Temperature to Cooling Stop Temperature of 400 to 590° C.: 5° C./s or More When the average cooling rate is less than 5° C., polygonal ferrite is excessively formed, and the microstructure of the steel sheet of the disclosed embodiments cannot be obtained. For this reason, the average cooling rate from the annealing temperature to the cooling stop temperature of 400 to 590° C. is 5° C./s or more. Preferably, the average cooling rate is 8° C./s or more.

When the cooling stop temperature is lower than 400° C., tempered martensite is formed, leading to a decrease in TS and deterioration in bendability. On the other hand, when the cooling stop temperature is higher than 590° C., polygonal ferrite is excessively formed, and the microstructure of the steel sheet of the disclosed embodiments cannot be obtained. For this reason, the cooling stop temperature is 400 to 590° C. Preferably, the cooling stop temperature is 440° C. or higher. The cooling stop temperature is preferably 560° C. or lower.

Retention for 10 to 1000 sec in Temperature Range of 730 to 900° C. of Heating to Cooling When the retention time in the temperature range of 730 to 900° C. is less than 10 sec, austenite is insufficiently formed, and the microstructure of the steel sheet of the disclosed embodiments cannot be obtained. On the other hand, when the retention time is more than 1000 sec, Mn is enriched in austenite, $[Mn]_{SM}/[Mn]_B$ exceeds 1.5, and bendability and plating properties deteriorate. For this reason, the retention time is 10 to 1000 sec. Preferably, the retention time is 30 sec or more. The retention time is preferably 500 sec or less. Here, the retention time is the dwell time (pass time) of the steel sheet in the annealing temperature range described above. The retention does not necessarily represent a constant state, and includes heating and cooling states in the temperature range of 730 to 900° C.

Retention for 1,000 sec or Less in Temperature Range of 400 to 590° C.

When the retention time in the temperature range of 400 to 590° C. exceeds 1000 sec, ferrite transformation and bainite transformation excessively proceed or pearlite is formed, whereby the microstructure of the steel sheet of the disclosed embodiments cannot be obtained. For this reason, the retention time in the temperature range of 400 to 590° C. is 1000 sec or less, preferably 500 sec or less, more preferably 200 sec or less. Here, the retention time is the dwell time (pass time) of the steel sheet in the temperature range described above. The retention does not necessarily represent a constant state.

Dew Point in Temperature Range of 730 to 900° C.: −40° C. or Lower (Preferred Condition)

By making the dew point −40° C. or lower in the temperature range of 730 to 900° C., enrichment of Si and Mn onto the steel sheet surface can be reduced, the bainite transformation near the surface layer of the steel sheet is facilitated, and the grain size of martensite can be further refined. As a result, bendability and plating properties can be further improved. For this reason, the dew point in the temperature range of 730 to 900° C. is preferably −40° C. or lower, more preferably −45° C. or lower. The lower limit of the dew point of the atmosphere is not particularly specified. However, the dew point is preferably −80° C. or higher because the effect becomes saturated when the dew point is lower than −80° C., and poses cost disadvantages. The temperature in the above-described temperature range is based on the surface temperature of the steel sheet. Specifically, the dew point is adjusted in the above-described range when the surface temperature of the steel sheet is in the above-described temperature range.

Elongation Ratio of Temper Rolling: 0.6% or Less (Preferred Condition)

Temper rolling is performed after the cooling, as needed. The temper rolling introduces dislocation, and the aging resistance becomes poor. For this reason, the elongation ratio of temper rolling is preferably 0.6% or less. From the viewpoint of sheet surface qualities or sheet shape, the elongation ratio of temper rolling is preferably 0.1% or more.

When the steel sheet is to be sold, the steel sheet is typically sold after being cooled to room temperature following the cooling or temper rolling.

As described above, according to the disclosed embodiments, a desired steel sheet can be obtained only by primary annealing. By secondary annealing, a desired microstructure of the steel sheet of the disclosed embodiments can also be obtained, or the content of Mn in martensite present in the range of 20 μm in the sheet thickness direction from the steel sheet surface ($[Mn]_{SM}$) and the content of Mn at a location (in a bulk) of ¼-thickness of the steel sheet toward a center in the sheet thickness direction from the steel sheet surface ($[Mn]_B$) can also satisfy $[Mn]_{SM}/[Mn]_B \leq 1.5$. However, in order that the desired microstructure of the steel sheet of the disclosed embodiments is stably obtained or the content of Mn in martensite present in the range of 20 μm in the sheet thickness direction from the steel sheet surface ($[Mn]_{SM}$) and the content of Mn at a location (in a bulk) of ¼-thickness of the steel sheet toward a center in the sheet thickness direction from the steel sheet surface ($[Mn]_B$) satisfies $[Mn]_{SM}/[Mn]_B \leq 1.5$, the steel sheet is preferably manufactured by the primary annealing.

<Method of Production of Plated Steel Sheet>

A method for producing a plated steel sheet of the disclosed embodiments is a method by which the steel sheet obtained above is plated. Plating may be, for example, a hot-dip galvanizing process, or a process that involves alloying after hot-dip galvanizing. Annealing and galvanizing may be continuously performed on the same line. The plating layer may be formed by electroplating such as electroplating of a Zn—Ni alloy, or may be formed by hot-dip plating of a zinc-aluminum-magnesium alloy. Preferred is galvanizing, as described above in conjunction with the plating layer. It is, however, possible to perform plating using other metals such as aluminum. The following descriptions are given through the case of hot-dip plating.

Hot-dip plating is performed by dipping the steel sheet in a plating bath. In the case of this method, the steel sheet (steel sheet) dipped in a plating bath needs to be adjusted to a temperature of 450° C. or higher and 550° C. or lower. With temperatures outside of the temperature range of the 450° C. or higher and 550° C. or lower, foreign substance may occur in the plating bath, or it may not be possible to control the plating bath temperature. For this reason, the temperature of the steel sheet dipped in the plating bath is adjusted to 450° C. or higher and 550° C. or lower. The temperature of the steel sheet dipped in the plating bath is more preferably 460° C. or higher. The temperature of the steel sheet dipped in the plating bath is preferably 540° C. or lower.

The hot-dip plating may be followed by an alloying treatment, as required. The alloying treatment temperature, and the alloying treatment time are not particularly limited, and may be appropriately set.

After the steel sheet is produced by a continuous hot-dip plating line, and the plated steel sheet may be immediately produced using the steel sheet.

After being plated, the steel sheet is preferably cooled to room temperature at an average cooling rate of 3° C./s or more from the viewpoint of both of TS and bendability.

EXAMPLES

Example 1

The disclosed embodiments will be described in detail below with reference to Examples. The technical scope of the disclosed embodiments is not limited to the following Examples.

Steels of the compositions (with the balance Fe and unavoidable impurities) shown in Table 1 were melted with a vacuum melting furnace, and prepared into a steel slab by rolling. The steel slabs were heated to 1,200° C., rough rolled, and subjected to hot rolling under the conditions shown in Table 2 to produce hot-rolled steel sheets (HR). Some of the steel sheets were cold rolled to a thickness of 1.4 mm to obtain cold-rolled full hard steel sheets (CR). The hot-rolled steel sheets and the cold-rolled full hard steel sheets were annealed. The steel sheets were then subjected to hot-dip galvanizing, and, as required, hot-dip galvannealing to produce hot-dip galvanized steel sheets (GI), and hot-dip galvannealed steel sheets (GA) The annealing was performed in a plating treatment apparatus under the conditions shown in Table 2. The hot-dip galvanized steel sheets were dipped in a 465° C. plating bath to form a plating layer with a coating weight of 35 to 45 g/m$^2$ for each side. The hot-dip galvannealed steel sheets were subjected to alloying in which the plated steel sheets were retained at 500 to 600° C. for 1 to 60 sec to make the Fe content in the plating layer 6 mass % or more and 14 mass % or less. The plated steel sheets were cooled at the average cooling rate of 8° C./s.

The hot-dip galvanized steel sheets, and the hot-dip galvannealed steel sheets were then subjected to temper rolling at an elongation ratio of 0.3%, and tested to evaluate the tensile characteristics, bendability, and plating properties in the manner described below. The steel sheets were also measured for microstructure. The results of these measurements are presented in Table 3.

<Observation of Microstructure>

The area ratio of each phase was evaluated using the following technique. A sample is cut from the a steel sheet such that a cross section parallel to the rolling direction is an observation surface, and the cross section is polished. Then, after corroding the surface with 3% nital, a micrograph is taken for three fields of view at a location in the vicinity of the steel sheet surface (a location of 20 μm in the sheet thickness direction from the steel sheet surface) and at a location of 300 μm in the sheet thickness direction from the steel sheet surface, using a SEM (scanning electron microscope) at a magnification of 1,500 times. The area ratio of each microstructure is determined from the obtained image data, using the Image-Pro available from Media Cybernetics, and the average area ratio of these fields of view is defined as the area ratio of each microstructure. A micrograph is taken for ten fields of view at a ¼-thickness of the sheet. In the image data, the polygonal ferrite appears black having a smooth curved grain boundary, the martensite and residual austenite appear white or light gray, and bainite appears gray or dark gray including carbides having a straight grain boundary with aligned orientations or island-like martensite, whereby these phases are distinguished from each other. In the disclosed embodiments, martensite includes auto-tempered martensite containing carbides.

<Tensile Test>

A JIS 5 tensile test piece (JIS Z 2201) was collected from the hot-dip galvanized steel sheet (GI) or the hot-dip galvannealed steel sheet (GA) in a direction orthogonal to the rolling direction, and subjected to a JIS Z 2241 tensile test at a strain rate of 10$^{-3}$/s to determine TS and EL. In the disclosed embodiments, samples were acceptable when the TS was 1,180 MPa or more.

<Bendability>

A strip-shaped test piece having 30 mm in width and 100 mm in length was collected from the hot-dip galvanized steel sheet (GI) or the hot-dip galvannealed steel sheet (GA), and subjected to a flexure test in which the test piece was bent in a direction parallel to the rolling direction. By performing a V-bend test at an angle of 90° under the conditions of a stroke speed of 500 mm/s, a press load of 10 ton, and a press-retention time of 5 seconds, and by observing the ridge line at the bending position using a magnifier at a magnification of 10 times, the minimum bending radius (mm) at which cracks of 0.5 mm or more could not recognized was determined, and R/t was calculated by dividing the minimum bending radius by the sheet thickness (mm). Samples were acceptable when R/t was 3.5 or less.

<Plating Properties>

A strip-shaped test piece having 30 mm in width and 30 mm in length was collected from the hot-dip galvanized steel sheet or the hot-dip galvannealed steel sheet, and the surface of the steel sheet was observed using a magnifier at a magnification of 10 times. Samples were acceptable when non-plating having a diameter of 0.5 mm or more was recognized.

TABLE 1

| Steel | Composition (mass %) | | | | | | | Other | Remarks |
|---|---|---|---|---|---|---|---|---|---|
| | C | Si | Mn | P | S | Al | N | | |
| A | 0.10 | 0.60 | 3.5 | 0.015 | 0.001 | 0.035 | 0.003 | Mo: 0.150 | Example |
| B | 0.15 | 0.30 | 3.0 | 0.019 | 0.002 | 0.033 | 0.006 | Nb: 0.025 | Example |
| C | 0.20 | 0.01 | 2.5 | 0.022 | 0.004 | 0.036 | 0.008 | Ti: 0.035 | Example |
| D | 0.10 | 0.40 | 2.5 | 0.029 | 0.002 | 0.040 | 0.011 | Ti: 0.040, Nb: 0.030, B: 0.0020 | Example |
| E | 0.15 | 0.10 | 2.5 | 0.008 | 0.003 | 0.039 | 0.003 | Cr: 0.500, Nb: 0.030, Mo: 0.100, B: 0.0010 | Example |
| F | 0.10 | 0.05 | 3.0 | 0.011 | 0.002 | 0.031 | 0.005 | Ni: 0.200, Ti: 0.030, Mo: 0.100, REM: 0.0010 | Example |
| G | 0.15 | 0.10 | 3.0 | 0.015 | 0.002 | 0.035 | 0.007 | Mo: 0.100, V: 0.050, Cu: 0.200, Ca: 0.0010 | Example |
| H | 0.10 | 0.20 | 2.5 | 0.006 | 0.001 | 0.028 | 0.003 | Cr: 0.500, Nb: 0.050, Ti: 0.020, B: 0.0010 | Example |
| I | 0.20 | 0.70 | 2.0 | 0.031 | 0.002 | 0.034 | 0.006 | Ti: 0.020, Nb: 0.040, Mo: 0.200, B: 0.0020, Sb: 0.0100 | Example |
| J | 0.22 | 0.10 | 2.5 | 0.024 | 0.003 | 0.410 | 0.003 | Mo: 0.100, B: 0.0005, Sn: 0.0500 | Example |
| K | 0.04 | 0.50 | 2.5 | 0.018 | 0.002 | 0.035 | 0.005 | Ti: 0.020, Mo: 0.200, B: 0.0020 | Comparative Example |
| L | 0.26 | 0.10 | 2.5 | 0.014 | 0.002 | 0.034 | 0.004 | Cr: 0.100, Nb: 0.030, Mo: 0.050 | Comparative Example |
| M | 0.15 | 1.20 | 2.5 | 0.019 | 0.003 | 0.042 | 0.005 | Ti: 0.020, V: 0.100, B: 0.0020 | Comparative Example |
| N | 0.15 | 0.20 | 1.4 | 0.020 | 0.002 | 0.036 | 0.003 | Ti: 0.020, Nb: 0.010, Mo: 0.200, B: 0.0020 | Comparative Example |
| O | 0.15 | 0.02 | 4.2 | 0.014 | 0.002 | 0.032 | 0.003 | Ti: 0.010, Nb: 0.010, Mo: 0.100 | Comparative Example |
| P | 0.15 | 0.01 | 3.0 | 0.015 | 0.002 | 0.036 | 0.007 | — | Comparative Example |

TABLE 2

| Steel sheet No. | Steel | Hot rolling conditions | | | | | | | Annealing | | |
|---|---|---|---|---|---|---|---|---|---|---|---|
| | | Temperature from second pass to last pass (° C.) | All rolling ratio (%) | Cumulative rolling ratio from second pass to last pass | Last pass rolling ratio (%) | Cooling start time after finishing rolling (s) | Average cooling rate between .600 and 720° C. (° C./s) | Coiling temperature (° C.) | Cold rolling Cold rolling ratio (%) | Average heating rate between .500 and 650° C. (° C./s) | Annealing temperature (° C.) |
| 1 | A | 890 | 90 | 30 | 15 | 1.0 | 200 | 500 | 50 | 5.0 | 810 |
| 2 | | 990 | 90 | 30 | 15 | 1.0 | 200 | 500 | 50 | 5.0 | 810 |
| 3 | | 750 | 90 | 30 | 15 | 1.0 | 200 | 500 | 50 | 5.0 | 810 |
| 4 | | 890 | 90 | 30 | 30 | 1.0 | 200 | 500 | 50 | 5.0 | 810 |
| 5 | | 890 | 90 | 30 | 5 | 1.0 | 200 | 500 | 50 | 5.0 | 810 |
| 6 | B | 890 | 90 | 30 | 15 | 1.0 | 50 | 500 | 50 | 1.5 | 810 |
| 7 | | 890 | 90 | 30 | 15 | 1.0 | 20 | 500 | 50 | 1.5 | 810 |
| 8 | | 890 | 90 | 30 | 15 | 1.0 | 200 | 620 | 50 | 1.5 | 810 |
| 9 | | 890 | 90 | 30 | 15 | 1.0 | 200 | 500 | 15 | 1.5 | 810 |
| 10 | C | 890 | 90 | 30 | 15 | 1.0 | 200 | 450 | 40 | 3.0 | 810 |
| 11 | | 890 | 90 | 30 | 15 | 1.0 | 200 | 450 | 40 | 3.0 | 700 |
| 12 | | 890 | 90 | 30 | 15 | 1.0 | 200 | 450 | 40 | 3.0 | 920 |
| 13 | | 890 | 90 | 30 | 15 | 1.0 | 200 | 450 | 40 | 3.0 | 810 |
| 14 | | 890 | 90 | 30 | 15 | 1.0 | 200 | 450 | 50 | 3.0 | 810 |
| 15 | D | 890 | 90 | 30 | 15 | 1.0 | 200 | 500 | — | 10.0 | 780 |
| 16 | | 890 | 90 | 30 | 15 | 1.0 | 200 | 500 | — | 10.0 | 780 |
| 17 | | 890 | 90 | 30 | 15 | 1.0 | 200 | 500 | — | 10.0 | 780 |
| 18 | | 890 | 90 | 30 | 15 | 1.0 | 200 | 500 | — | 10.0 | 780 |
| 19 | E | 890 | 90 | 30 | 15 | 1.0 | 200 | 500 | 50 | 5.0 | 790 |
| 20 | | 890 | 90 | 30 | 15 | 1.0 | 200 | 500 | 50 | 5.0 | 810 |
| 21 | F | 890 | 90 | 30 | 15 | 1.0 | 200 | 500 | 50 | 5.0 | 850 |
| 22 | G | 890 | 90 | 30 | 15 | 1.0 | 200 | 500 | 50 | 30.0 | 750 |
| 23 | | 890 | 90 | 30 | 15 | 0.1 | 200 | 500 | 50 | 30.0 | 750 |
| 24 | | 890 | 90 | 30 | 15 | 5.0 | 200 | 500 | 50 | 30.0 | 750 |
| 25 | H | 890 | 90 | 30 | 15 | 1.0 | 200 | 500 | 50 | 2.0 | 810 |
| 26 | | 890 | 90 | 30 | 15 | 1.0 | 200 | 500 | 50 | 0.6 | 810 |
| 27 | I | 890 | 90 | 30 | 15 | 1.0 | 200 | 500 | 50 | 5.0 | 850 |
| 28 | | 890 | 90 | 30 | 15 | 1.0 | 200 | 500 | 50 | 5.0 | 850 |
| 29 | J | 890 | 90 | 30 | 15 | 1.0 | 200 | 500 | 50 | 5.0 | 810 |
| 30 | | 890 | 90 | 9 | 5 | 1.0 | 200 | 500 | 50 | 5.0 | 810 |
| 31 | | 890 | 90 | 41 | 15 | 1.0 | 200 | 500 | 50 | 5.0 | 810 |
| 32 | K | 890 | 90 | 30 | 15 | 1.0 | 200 | 500 | 50 | 5.0 | 810 |
| 33 | L | 890 | 90 | 30 | 15 | 1.0 | 200 | 500 | 50 | 5.0 | 810 |
| 34 | M | 890 | 90 | 30 | 15 | 1.0 | 200 | 500 | 50 | 5.0 | 810 |
| 35 | N | 890 | 90 | 30 | 15 | 1.0 | 200 | 500 | 50 | 5.0 | 810 |
| 36 | O | 890 | 90 | 30 | 15 | 1.0 | 200 | 500 | 50 | 5.0 | 810 |
| 37 | P | 890 | 90 | 30 | 15 | 1.0 | 200 | 500 | 50 | 5.0 | 840 |

TABLE 2-continued

| 38 | A | 890 | 90 | 30 | 15 | 1.0 | 200 | 500 | 50 | 3.0 | 880 |
| 39 | A | 890 | 90 | 30 | 15 | 1.0 | 200 | 500 | 50 | 5.0 | 810 |
| 40 | A | 890 | 90 | 30 | 15 | 1.0 | 200 | 500 | 50 | 5.0 | 810 |
| 41 | A | 890 | 90 | 30 | 15 | 1.0 | 200 | 500 | 50 | 3.0 | 810 |

| | | Annealing | | | | | Plating | | | | |
|---|---|---|---|---|---|---|---|---|---|---|---|
| Steel sheet No. | Steel | Retention time in (s) | Dew point between 730° C. and 900° C. (° C.) | Average cooling rate (° C./s) | Cooling stop temperature (° C.) | Cooling stop retention time (s) | Plating bath temperature (° C.) | Alloying temperature (° C.) | Alloying retention time (s) | *Plating condition | Remarks |
| 1 | A | 200 | −45 | 15 | 500 | 60 | 465 | 520 | 20 | GA | Present Example |
| 2 | | 200 | −45 | 15 | 500 | 60 | 465 | 520 | 20 | GA | Comparative Example |
| 3 | | 200 | −45 | 15 | 500 | 60 | 465 | 520 | 20 | GA | Comparative Example |
| 4 | | 200 | −45 | 15 | 500 | 60 | 465 | 520 | 20 | GA | Comparative Example |
| 5 | | 200 | −45 | 15 | 500 | 60 | 465 | 520 | 20 | GA | Comparative Example |
| 6 | B | 600 | −49 | 30 | 500 | 100 | 465 | — | — | GI | Present Example |
| 7 | | 600 | −49 | 30 | 500 | 100 | 465 | — | — | GI | Comparative Example |
| 8 | | 600 | −49 | 30 | 500 | 100 | 465 | — | — | GI | Comparative Example |
| 9 | | 600 | −49 | 30 | 500 | 15 | 465 | 500 | 30 | GI | Comparative Example |
| 10 | C | 200 | −55 | 8 | 500 | 15 | 465 | 500 | 30 | GA | Present Example |
| 11 | | 200 | −55 | 8 | 500 | 15 | 465 | 500 | 30 | GA | Comparative Example |
| 12 | | 200 | −55 | 8 | 500 | 15 | 465 | 500 | 30 | GA | Comparative Example |
| 13 | | 1 | −55 | 8 | 500 | 15 | 465 | 500 | 30 | GA | Comparative Example |
| 14 | | 1200 | −55 | 8 | 500 | 100 | 465 | 520 | 20 | GA | Comparative Example |
| 15 | D | 200 | −47 | 15 | 500 | 100 | 465 | 520 | 20 | GA | Present Example |
| 16 | | 200 | −47 | 15 | 620 | 100 | 465 | 520 | 20 | GA | Comparative Example |
| 17 | | 200 | −47 | 15 | 350 | 100 | 465 | 520 | 20 | GA | Comparative Example |
| 18 | | 200 | −47 | 1 | 500 | 100 | 465 | 520 | 20 | GA | Comparative Example |
| 19 | E | 200 | −47 | 15 | 460 | 800 | 465 | 520 | 20 | GA | Present Example |
| 20 | | 200 | −47 | 15 | 460 | 1200 | 465 | 520 | 20 | GA | Comparative Example |
| 21 | F | 200 | −47 | 15 | 550 | 100 | 465 | — | — | GI | Present Example |
| 22 | G | 800 | −47 | 15 | 500 | 100 | 465 | 520 | 20 | GA | Present Example |
| 23 | | 800 | −47 | 15 | 500 | 100 | 465 | 520 | 20 | GA | Comparative Example |
| 24 | | 800 | −47 | 15 | 500 | 100 | 465 | 520 | 20 | GA | Comparative Example |
| 25 | H | 200 | −47 | 15 | 500 | 100 | 465 | 520 | 20 | GA | Present Example |
| 26 | | 200 | −47 | 15 | 500 | 100 | 465 | 520 | 20 | GA | Comparative Example |
| 27 | I | 200 | −47 | 15 | 500 | 100 | 465 | 530 | 20 | GA | Present Example |
| 28 | | 200 | −38 | 15 | 500 | 100 | 465 | 530 | 20 | GA | Present Example |
| 29 | J | 200 | −47 | 15 | 500 | 100 | 465 | 520 | 20 | GA | Present Example |
| 30 | | 200 | −47 | 15 | 500 | 100 | 465 | 520 | 20 | GA | Comparative Example |
| 31 | | 200 | −47 | 15 | 500 | 100 | 465 | 520 | 20 | GA | Comparative Example |
| 32 | K | 200 | −47 | 15 | 500 | 100 | 465 | 520 | 20 | GA | Comparative Example |

TABLE 2-continued

| | | | | | | | | | | |
|---|---|---|---|---|---|---|---|---|---|---|
| 33 | L | 200 | −47 | 15 | 500 | 100 | 465 | 520 | 20 | GA | Comparative Example |
| 34 | M | 200 | −47 | 15 | 500 | 100 | 465 | 550 | 20 | GA | Comparative Example |
| 35 | N | 200 | −47 | 15 | 500 | 100 | 465 | 520 | 20 | GA | Comparative Example |
| 36 | O | 200 | −47 | 15 | 500 | 100 | 465 | 520 | 20 | GA | Comparative Example |
| 37 | P | 200 | −47 | 15 | 500 | 100 | 465 | 520 | 20 | GA | Comparative Example |
| 38 | A | 200 | −47 | 15 | 500 | 30 | 465 | 520 | 20 | GA | Present Example |
| 39 | A | 200 | −45 | 15 | 600 | 60 | 465 | 520 | 20 | GA | Comparative Example |
| 40 | A | 200 | −45 | 15 | 500 | 60 | 465 | 520 | 20 | GA | Present Example |
| 41 | A | 200 | −45 | 15 | 500 | 60 | 465 | 520 | 20 | GA | Present Example |

*Plating condition: GI: hot-dip galvanized steel sheet, GA: hot-dip galvannealed steet sheet
**After primary annealing (heating rate of 3° C., annealing temperature of 850° C., annealing retention time of 120 sec, cooling rate of 5° C./s), secondary annealing (under conditions described in Table) was performed

TABLE 3

| Steel sheet No. | *Microstructure Region to 20 μm from surface | | | | *Microstructure Location 300 μm from surface | | | $[Mn]_{SA}/[Mn]_B$ | Mechanical characteristics TS (MPa) | R/t | Plating capability | Remark |
|---|---|---|---|---|---|---|---|---|---|---|---|---|
| | V(.PF) (%) | V(M + B + γ) (%) | Other (%) | D(M) (μm) | V(M) (%) | D(PF) (μm) | D(B) (μm) | | | | | |
| 1 | 22 | 78 | 0 | 6.8 | 61 | 8.0 | 7.2 | 1.1 | 1198 | 2.1 | O | Present Example |
| 2 | 28 | 72 | 0 | 7.6 | 64 | 17.1 | 7.5 | 1.7 | 1163 | 4.3 | X | Comparative Example |
| 3 | 23 | 77 | 0 | 6.6 | 61 | 8.2 | 7.9 | 1.8 | 1221 | 3.9 | X | Comparative Example |
| 4 | 25 | 75 | 0 | 6.9 | 64 | 7.7 | 7.9 | 1.6 | 1194 | 4.3 | X | Comparative Example |
| 5 | 25 | 75 | 0 | 7.2 | 65 | 16.4 | 6.9 | 1.7 | 1168 | 3.9 | X | Comparative Example |
| 6 | 29 | 71 | 0 | 6.7 | 70 | 7.4 | 6.6 | 1.4 | 1259 | 2.9 | O | Present Example |
| 7 | 30 | 70 | 0 | 7.0 | 72 | 7.2 | 6.8 | 1.8 | 1266 | 3.9 | X | Comparative Example |
| 8 | 30 | 70 | 0 | 6.9 | 70 | 7.4 | 6.5 | 1.9 | 1253 | 4.3 | X | Comparative Example |
| 9 | 30 | 70 | 0 | 6.7 | 69 | 17.8 | 6.1 | 1.8 | 1256 | 4.3 | X | Comparative Example |
| 10 | 15 | 85 | 0 | 6.6 | 64 | 5.8 | 6.1 | 1.1 | 1272 | 2.5 | O | Present Example |
| 11 | 98 | 2 | 0 | 1.3 | 3 | 15.3 | — | 2.0 | 714 | 0.7 | X | Comparative Example |
| 12 | 0 | 100 | 0 | 13.3 | 72 | — | 16.9 | 1.6 | 1178 | 3.9 | X | Comparative Example |
| 13 | 80 | 20 | 0 | 2.9 | 27 | 8.4 | — | 1.3 | 914 | 2.5 | O | Comparative Example |
| 14 | 11 | 89 | 0 | 8.8 | 76 | 5.4 | 4.8 | 1.9 | 1340 | 4.6 | X | Comparative Example |
| 15 | 41 | 59 | 0 | 3.4 | 61 | 3.6 | — | 1.1 | 1204 | 2.1 | O | Present Example |
| 16 | 65 | 35 | 0 | 5.8 | 35 | 9.5 | — | 1.1 | 1058 | 1.4 | O | Comparative Example |
| 17 | 40 | 30 | 30 | 1.7 | 18 | 3.8 | 3.2 | 1.1 | 1123 | 3.2 | O | Comparative Example |
| 18 | 63 | 37 | 0 | 6.0 | 38 | 8.6 | — | 1.3 | 1077 | 2.1 | O | Comparative Example |
| 19 | 34 | 66 | 0 | 6.8 | 55 | 7.6 | 6.6 | 1.2 | 1235 | 2.9 | O | Present Example |
| 20 | 32 | 68 | 0 | 7.1 | 36 | 7.7 | 7.0 | 1.1 | 1139 | 1.4 | O | Comparative Example |
| 21 | 1 | 99 | 0 | 7.4 | 65 | 1.1 | 11.5 | 1.0 | 1186 | 1.8 | O | Present Example |
| 22 | 50 | 50 | 0 | 3.8 | 51 | 4.2 | — | 1.5 | 1217 | 3.2 | O | Present Example |
| 23 | 49 | 51 | 0 | 4.0 | 49 | 3.9 | — | 1.9 | 1223 | 3.9 | X | Comparative Example |
| 24 | 53 | 47 | 0 | 3.6 | 48 | 4.3 | — | 1.8 | 1212 | 3.9 | X | Comparative Example |
| 25 | 30 | 70 | 0 | 6.5 | 58 | 7.4 | 5.9 | 1.2 | 1193 | 2.5 | O | Present Example |
| 26 | 33 | 67 | 0 | 5.4 | 57 | 15.9 | 16.0 | 1.2 | 1150 | 2.5 | O | Comparative Example |
| 27 | 5 | 95 | 0 | 6.5 | 62 | 2.1 | 9.6 | 1.0 | 1238 | 1.8 | O | Present Example |
| 28 | 5 | 95 | 0 | 12.6 | 74 | 2.0 | 9.3 | 1.0 | 1284 | 2.5 | O | Present Example |
| 29 | 24 | 76 | 0 | 8.7 | 54 | 7.4 | 6.6 | 1.2 | 1266 | 2.5 | O | Present Example |
| 30 | 25 | 75 | 0 | 8.5 | 55 | 7.2 | 5.9 | 1.6 | 1268 | 3.9 | X | Comparative Example |
| 31 | 25 | 75 | 0 | 8.4 | 54 | 12.1 | 6.3 | 1.6 | 1254 | 4.3 | X | Comparative Example |
| 32 | 32 | 68 | 0 | 3.8 | 25 | 5.8 | 6.0 | 1.2 | 886 | 0.7 | O | Comparative Example |
| 33 | 3 | 97 | 0 | 6.4 | 80 | 1.5 | 5.4 | 1.0 | 1484 | 5.0 | O | Comparative Example |
| 34 | 42 | 58 | 0 | 7.3 | 59 | 8.6 | — | 1.3 | 1248 | 2.9 | X | Comparative Example |
| 35 | 24 | 76 | 0 | 3.4 | 20 | 6.5 | 6.0 | 1.1 | 903 | 1.4 | O | Comparative Example |
| 36 | 0 | 100 | 0 | 5.9 | 100 | — | — | 1.0 | 1433 | 4.3 | O | Comparative Example |
| 37 | 5 | 95 | 0 | 12.9 | 54 | 3.7 | 15.8 | 1.0 | 1174 | 3.6 | O | Comparative Example |
| 38 | 7 | 93 | 0 | 121.2 | 78 | 2.4 | 2.7 | 1.0 | 1231 | 3.4 | O | Present Example |
| 39 | 61 | 39 | 0 | 5.6 | 38 | 9.8 | — | 1.1 | 1120 | 1.8 | O | Comparative Example |
| 40 | 11 | 89 | 0 | 6.6 | 76 | 5.9 | 6.0 | 1.1 | 1255 | 2.9 | O | Present Example |
| 41 | 42 | 58 | 0 | 6.1 | 58 | 7.3 | 5.7 | 1.5 | 1181 | 3.4 | O | Present Example |

*V(PF): area ratio of polygonal ferrite, V(M + B + γ): total area ratio of martensite and bainite and retained austenite, V(M): area ratio of martensite
Other: area ratio of phases except for the above phase
D(M): average crystal grain size of martensite, D(PF): average crystal grain size of polygonal ferrite, D(B): average crystal grain size of bainite Present examples are all high-strength galvanized steel sheets having TS of 1,180 MPa or more and R/t of 3.5 or less with no-plating. Comparative Examples outside of the ranges of the disclosed embodiments had at least one of TS, R/t, and plating properties inferior to those of the present examples.

No. 28 is a present example in which the dew point is out of the preferred range. The bainite transformation was delayed and the martensite grain size was increased as compared with other present examples in which the dew point was within the preferred range, and bendability and plating properties were slightly inferior but had no problem in terms of an effect.

The invention claimed is:

1. A steel sheet having a chemical composition comprising, by mass %:
   C: 0.05 to 0.25%;
   Si: 1.0% or less;
   Mn: 2.0 to 4.0%;
   P: 0.100% or less;
   S: 0.02% or less;
   Al: 1.0% or less;
   N: 0.001 to 0.015%;
   at least one element selected from the group consisting of Ti: 0.003 to 0.100%, Nb: 0.003 to 0.100%, and Mo: 0.005 to 0.500%; and
   a balance being Fe and unavoidable impurities,
   wherein:
   the steel sheet has:
      a tensile strength of 1,180 MPa or more,
      a microstructure comprising:
         in a region of the steel sheet that extends from a surface of the steel sheet to a position 20 μm from the surface of the steel sheet in a sheet thickness direction, in terms of an area ratio:
            polygonal ferrite in a range of 0 to 60%, and
            a total of martensite, bainite, and residual austenite in a range of 40 to 100%, and
         at a location 300 μm from the surface of the steel sheet in the sheet thickness direction:
            in terms of an area ratio, martensite in a range of 40 to 80%, and
            polygonal ferrite and bainite having an average crystal grain size of less than 15 μm, and $[Mn]_{SM}/[Mn]_B \leq 1.5$, where:

$[Mn]_{SM}$ resents a content of Mn in martensite present in the region of the steel sheet that extends from the surface of the steel sheet to the position 20 μm from the surface of the steel sheet, and
   $[Mn]_B$ represents a content of Mn at a position located a distance of ¼-thickness of the steel sheet toward a center of the steel sheet in the sheet thickness direction from the surface of the steel sheet.

2. The steel sheet according to claim 1, wherein the chemical composition further comprises, by mass %, at least one element selected from the group consisting of:
   Cr: 0.005 to 2.000%,
   V: 0.005 to 2.000%,
   Cu: 0.005 to 2.000%,
   Ni: 0.005 to 2.000%,
   B: 0.0001 to 0.0050%,
   Ca: 0.0001 to 0.0050%,
   REM: 0.0001 to 0.0050%,
   Sb: 0.0010 to 0.1000%, and
   Sn: 0.0010 to 0.5000%.

3. The steel sheet according to claim 1, wherein an average crystal grain size of the martensite present in the region of the steel sheet that extends from the surface of the steel sheet to the position 20 μm from the surface of the steel sheet in the sheet thickness direction is 20 μm or less.

4. A plated steel sheet comprising a plating layer disposed on the surface of the steel sheet of claim 1.

5. A plated steel sheet comprising a plating layer disposed on the surface of the steel sheet of claim 3.

6. The plated steel sheet according to claim 4, wherein the plating layer is a hot-dip galvanized layer or a hot-dip galvannealed layer.

7. The plated steel sheet according to claim 5, wherein the plating layer is a hot-dip galvanized layer or a hot-dip galvannealed layer.

8. A method of producing a steel sheet according to claim 1, the method comprising:
   hot rolling a slab having the chemical composition to produce a hot-rolled steel sheet, the hot rolling comprising finish rolling under conditions in which a temperature from a second-to-last pass to a last pass is in a range of 800 to 950° C., a cumulative rolling ratio from the second-to-last pass to the last pass is in a range of 10 to 40%, and a rolling ratio of the last pass is in a range of 8 to 25%;
   cooling the hot-rolled steel sheet at an average cooling rate of 30° C./s or more and in a temperature range of 600 to 720° C., the cooling starting at a time in a range of 0.5 to 3.0 sec after an end of the finish rolling; and
   coiling the hot-rolled steel sheet at a temperature of 590° C. or lower.

9. The method according to claim 8, further comprising:
   cold rolling the hot-rolled steel sheet at a cold-rolling ratio of 20% or more to produce a cold-rolled steel sheet.

10. The method according to claim 8, further comprising:
    heating the hot-rolled steel sheet to a temperature in a range of 730 to 900° C. at an average heating rate of 1.0° C./s or more in a temperature range of 500 to 650° C.; and then
    cooling the hot-rolled steel sheet to a cooling stop temperature of 400 to 590° C. at an average cooling rate of 5° C./s or more,
    wherein the hot-rolled steel sheet is retained for 10 to 1,000 sec in a temperature range of 730 to 900° C. for a duration of the heating and the cooling, and is retained for 1,000 sec or less in a temperature range of 400 to 590° C.

11. The method according to claim 9, further comprising:
    heating the cold-rolled steel sheet to a temperature in a range of 730 to 900° C. at an average heating rate of 1.0° C./s or more in a temperature range of 500 to 650° C.; and then
    cooling the cold-rolled steel sheet to a cooling stop temperature of 400 to 590° C. at an average cooling rate of 5° C./s or more,
    wherein the cold-rolled steel sheet is retained for 10 to 1,000 sec in a temperature range of 730 to 900° C. for a duration of the heating and the cooling, and is retained for 1,000 sec or less in a temperature range of 400 to 590° C.

12. The method according to claim 10, conducted in an atmosphere having a dew point of −40° C. or lower in the temperature range of 730 to 900° C.

13. The method according to claim 11, conducted in an atmosphere having a dew point of −40° C. or lower in the temperature range of 730 to 900° C.

14. A method for producing a plated steel sheet, the method comprising:
plating the steel sheet obtained by the method of claim 10; and
cooling the steel sheet to room temperature at an average cooling rate of 3° C./s or more.

15. A method for producing a plated steel sheet, the method comprising:
plating the steel sheet obtained by the method of claim 11; and
cooling the steel sheet to room temperature at an average cooling rate of 3° C./s or more.

16. A method for producing a plated steel sheet, the method comprising:
plating the steel sheet obtained by the method of claim 12; and
cooling the steel sheet to room temperature at an average cooling rate of 3° C./s or more.

17. A method for producing a plated steel sheet, the method comprising:
plating the steel sheet obtained by the method of claim 13; and
cooling the steel sheet to room temperature at an average cooling rate of 3° C./s or more.

18. The steel sheet according to claim 2, wherein an average crystal grain size of the martensite present in the region of the steel sheet that extends from the surface of the steel sheet to the position 20 μm from the surface of the steel sheet in the sheet thickness direction is 20 μm or less.

19. A plated steel sheet comprising a plating layer disposed on the surface of the steel sheet of claim 2.

20. A plated steel sheet comprising a plating layer disposed on the surface of the steel sheet of claim 18.

21. The plated steel sheet according to claim 19, wherein the plating layer is a hot-dip galvanized layer or a hot-dip galvannealed layer.

22. The plated steel sheet according to claim 20, wherein the plating layer is a hot-dip galvanized layer or a hot-dip galvannealed layer.

23. A method of producing a steel sheet according to claim 2, the method comprising:
hot rolling a slab having the chemical composition to produce a hot-rolled steel sheet, the hot rolling comprising finish rolling under conditions in which a temperature from a second-to-last pass to a last pass is in a range of 800 to 950° C., a cumulative rolling ratio from the second-to-last pass to the last pass is in a range of 10 to 40%, and a rolling ratio of the last pass is in a range of 8 to 25%;
cooling the hot-rolled steel sheet at an average cooling rate of 30° C./s or more and in a temperature range of 600 to 720° C., the cooling starting at a time in a range of 0.5 to 3.0 sec after an end of the finish rolling; and
coiling the hot-rolled steel sheet at a temperature of 590° C. or lower.

24. The method according to claim 23, further comprising:
cold rolling the hot-rolled steel sheet at a cold-rolling ratio of 20% or more to produce a cold-rolled steel sheet.

25. The method according to claim 23, further comprising:
heating the hot-rolled steel sheet to a temperature in a range of 730 to 900° C. at an average heating rate of 1.0° C./s or more in a temperature range of 500 to 650° C.; and then
cooling the hot-rolled steel sheet to a cooling stop temperature of 400 to 590° C. at an average cooling rate of 5° C./s or more,
wherein the hot-rolled steel sheet is retained for 10 to 1,000 sec in a temperature range of 730 to 900° C. for a duration of the heating and the cooling, and is retained for 1,000 sec or less in a temperature range of 400 to 590° C.

26. The method according to claim 24, further comprising:
heating the cold-rolled steel sheet to a temperature in a range of 730 to 900° C. at an average heating rate of 1.0° C./s or more in a temperature range of 500 to 650° C.; and then
cooling the cold-rolled steel sheet to a cooling stop temperature of 400 to 590° C. at an average cooling rate of 5° C./s or more,
wherein the cold-rolled steel sheet is retained for 10 to 1,000 sec in a temperature range of 730 to 900° C. for a duration of the heating and the cooling, and is retained for 1,000 sec or less in a temperature range of 400 to 590° C.

27. The method according to claim 25, conducted in an atmosphere having a dew point of −40° C. or lower in the temperature range of 730 to 900° C.

28. The method according to claim 26, conducted in an atmosphere having a dew point of −40° C. or lower in the temperature range of 730 to 900° C.

29. A method for producing a plated steel sheet, the method comprising:
plating the steel sheet obtained by the method of claim 25; and
cooling the steel sheet to room temperature at an average cooling rate of 3° C./s or more.

30. A method for producing a plated steel sheet, the method comprising:
plating the steel sheet obtained by the method of claim 26; and
cooling the steel sheet to room temperature at an average cooling rate of 3° C./s or more.

31. A method for producing a plated steel sheet, the method comprising:
plating the steel sheet obtained by the method of claim 27; and
cooling the steel sheet to room temperature at an average cooling rate of 3° C./s or more.

32. A method for producing a plated steel sheet, the method comprising:
plating the steel sheet obtained by the method of claim 28; and
cooling the steel sheet to room temperature at an average cooling rate of 3° C./s or more.

* * * * *